United States Patent [19]

Lee

[11] Patent Number: 4,880,335
[45] Date of Patent: Nov. 14, 1989

[54] METHOD AND APPARATUS FOR REMOVING CONCRETE COATING FROM PIPE

[75] Inventor: Charles M. Lee, Virginia Beach, Va.

[73] Assignee: Arabian American Oil Company, Dhahran, Saudi Arabia

[21] Appl. No.: 87,867

[22] Filed: Aug. 21, 1987

[51] Int. Cl.⁴ .................................................. F16L 1/00
[52] U.S. Cl. ................................ 405/158; 15/104.04;
29/426.4; 125/14; 125/23 R; 225/103; 405/154;
405/188; 405/191; 30/94
[58] Field of Search ............... 405/154, 173, 169, 172,
405/168, 171, 158, 170; 299/36; 175/262;
30/93, 94, 95; 51/241 S, 241 R; 427/444;
118/506, 72, 120; 15/104.04, 104.14, 104.16, 88;
134/34; 29/426.4; 125/1, 14, 23 R; 225/93, 97,
103

[56] References Cited

U.S. PATENT DOCUMENTS

| | | | |
|---|---|---|---|
| 1,263,836 | 4/1918 | Ball | 15/104.4 X |
| 3,196,042 | 7/1965 | Ralston | 427/444 |
| 3,228,146 | 1/1966 | Rosengarten et al. | 51/241 R X |
| 3,998,201 | 12/1976 | Miura et al. | 225/103 X |
| 4,044,749 | 8/1977 | Bowen et al. | 125/23 R |
| 4,124,015 | 11/1978 | Isaksson | 125/23 R |
| 4,229,121 | 10/1980 | Brown | 405/158 |
| 4,327,703 | 5/1982 | Destree | 29/426.4 X |
| 4,425,059 | 1/1984 | Colas et al. | 125/1 X |
| 4,484,559 | 11/1984 | Ledford et al. | 29/426.4 X |

FOREIGN PATENT DOCUMENTS 0995908  2/1983  U.S.S.R. ............................ 15/104.04
WO86/06696 11/1986  World Int. Prop. O. ........ 15/104.04

Primary Examiner—Dennis L. Taylor
Attorney, Agent, or Firm—Thomas E. Spath

[57] ABSTRACT

An apparatus having improved safety and performance characteristics for the removal of a coating from a tubular member, and particularly adapted for the removal of a concrete weight coat from submerged oil pipelines, comprising a generally C-shaped rigid frame member which is maintained in proper alignment by contact with the upper coated surface, is provided with a plurality of opposed, inwardly directed driven crusher blades located proximate the ends of the frame member and controlled driving means which are adapted to move the crusher blades. The method comprises positioning the apparatus on the coated pipeline, crushing the coating, raising the entire apparatus to free the fractured coating from the pipeline, retracting the crusher blades, and moving the apparatus to a new position on the pipeline.

28 Claims, 2 Drawing Sheets

METHOD AND APPARATUS FOR REMOVING CONCRETE COATING FROM PIPE

FIELD OF THE INVENTION

This invention relates generally to the field of sub-sea pipelines, and particularly to the repair of damaged or broken sections. Specifically, the invention provides a method and apparatus for removing concrete or cementitious coatings from pipes in submarine locations.

BACKGROUND OF THE INVENTION

When petroleum transporting pipes are laid under water it is necessary to coat them with several inches of concrete, usually reinforced with wire, to prevent the pipes from floating to the surface. If the pipeline is damaged, it is necessary to remove this concrete weight coat before repairs can be made to the pipeline itself.

Heretofore, removal of the concrete coat has been difficult, dangerous and slow. A common method of removal was for a diver to fracture the concrete with a pneumatic jack hammer and manually pry loose the fractured segments with a large bar. Concrete removal proceeded very slowly, with the diver often working at a depth where exertion was a major handicap. There was also the risk of injury from the jack hammer and the sharp edges of the reinforcing wire. Moreover, since the diver had to position himself adjacent to, or below the pipe, concrete fragments could strike or trap him on the sea bed. Operation of the jack hammer also reduced visibility by agitating silt on the sea bed, adding to the hazard by rendering the diver essentially blind while operating unwieldy and potentially dangerous equipment. Use of the jack hammer under these conditions also presented the risk of additional damage to pipelines in the form of nicks, dents, gouges, and, most seriously, linear splitting, caused by the pneumatic chisel.

Another method of weight coat removal, disclosed in U.S. Pat. Nos. 3,933,519 and 4,229,121 employs high pressure water jets. The latter patent discloses a pair of opposed jets affixed to a crescent which is mechanically oscillated about the axis of the pipeline. The crescent does not contact the pipeline and is supported and moved longitudinally along the pipeline by a boom and track. However, the automated equipment described in these patents is mechanically complex, bulky and obviously expensive to construct and maintain. In addition, the use of hydraulic jets to efficiently blast the concrete coating from the pipe will stir up the bottom silt and further reduce what is already generally very poor visibility.

The use of explosive charges, both of the blanket and linear type, is also well known in the art. The use of explosives presents obvious and special dangers, requires the skills and care of trained and experienced experts and produces results which are not always predictable.

It is therefore an object of this invention to provide an improved method and apparatus for removing concrete weight coats that is efficient, safe and economical to construct and operate.

It is another object of the invention to provide a method and apparatus that is capable of operation by a single diver and the practice of which will not contribute significantly to a reduction in the visibility in the area where the work is being performed.

It is yet another object of this invention to provide a method and apparatus for removing a concrete weight coat from a pipeline without the risk of further damage to the pipeline.

It is a further object of the invention to provide a method and apparatus for concrete weight coat removal that can be practiced with minimum exertion by the diver and one where the diver is able to control the movement and activation of the removal means directly, or by transmitted voice commands, or other signals, to a surface crew.

SUMMARY OF THE INVENTION

In its broadest terms, the apparatus of this invention comprises: (a) a generally C-shaped rigid frame member which is adapted to be lowered into contact with the coated surface; (b) drive means which are located on opposing ends of the C-shaped frame member; (c) crusher blades adapted to contact and fracture the surface coating which move in response to the drive means; and (d) controlled means for applying a driving force to the driving means.

More specifically, this invention contemplates a crusher assembly apparatus for fracturing a concrete or cementitious coating of predetermined thickness surrounding a tubular structure which comprises: (a) a generally C-shaped rigid frame member defining an intermediate central section and opposing end sections; (b) a plurality of opposed and inwardly directed hydraulic ram pistons secured to the opposing end sections of the frame member; (c) wedge-shaped crusher blades, where each blade is comprised of a plurality of radially disposed teeth terminating in an arcuate configuration which corresponds generally to the surface of the cementitious coating, and the crusher blades adapted to move in conjunction with the rams; (d) arcuate support means inwardly disposed on the intermediate central section of the frame member, i.e., approximately midway between the rams, the support means adapted to contact the upper surface of the coating to thereby position the frame member in a plane transverse to the longitudinal axis of the tubular structure, and the crusher blades in a plane passing through the central axis of the pipe; and (e) controlled means for supplying a pressurized hydraulic fluid from an external source to said rams to drive the crusher blades into contact with the coating.

The apparatus consists of a reinforced frame member of relatively simple construction which supports the concrete removal means in a position perpendicular to the longitudinal axis of the pipe. Concrete crusher driving means are provided in the form of a plurality of hydraulic pistons, or rams, directed inwardly from opposing sides of the coated pipe and located proximate the two ends of the reinforced frame member. Attached to the moving ends of the ram pistons are wedge-shaped crusher blades comprised of radially disposed truncated teeth terminating in a concave arcuate configuration approximating that of the pipe. In operation, the crusher blades are aligned in a plane which is perpendicular to the longitudinal axis of the pipe. The hydraulic rams are connected to external pressurizing means which provide an hydraulic driving force, i.e., hydraulic fluid. Using conventional techniques, the hydraulic fluid is delivered to the rams by one or more hoses, which hoses can be secured by clamps to the supporting frame member. The reinforced frame member preferably includes a centrally located arcuate supporting section adapted to contact the curved contour of the pipeline.

The apparatus is lowered by a crane, hoist, or the like, located on a barge or other surface platform, to the sub-sea pipeline location. A diver positions the device, and in one mode of operation, signals a surface operator to pressurize the rams, extending them uniformly so that the crusher blades make contact with the concrete weight coat to be removed from the pipe. Pressure is then increased sufficiently to crush and fracture the concrete coat in the region of the blades but without contacting the pipeline. When the maximum penetration has been achieved the entire frame member is raised, including the ram pistons and attached crusher blades, thereby separating the fractured coating from the pipeline. Typically, weight coatings applied to submerged pipelines include a wire reinforcing mesh in the concrete. In the practice of the method of this invention, once the crusher blades have penetrated it, the concrete coating is fractured entirely in the vicinity of the blades over the entire perimeter circumference of the coating. The frame member is then hoisted very slowly with a surface crane, thus separating the fractured coating while simultaneously parting the reinforcing wire. Once the wire has parted, the coating falls free from the crusher assembly and the lower portion of the pipeline.

As will be described in more detail below, the frame member is advantageously fitted with several points of attachment for the hoisting cable ends so that the angle of attack of the crusher blades can be varied, i.e., rotated about the central longitudinal axis of the pipeline. Thus, should any coating material or reinforcing wire remain after the first attack, the crusher blades may be retracted, and the apparatus rotated axially at the same position on the pipeline. When a given section is freed of the coating, the crusher blades are retracted, the apparatus is rotated axially to horizontal alignment and moved longitudinally along the pipeline to an adjacent location, where the operation is repeated.

In the practice of the method of the invention for removing concrete weight coats from pipes in sub-sea locations, concrete crusher means are located in opposing positions about the pipe and maintained in alignment by a unitary frame member which frame member is supported by the surface of the pipe, said crusher means being simultaneously activated to penetrate said concrete coating to a pre-determined distance, and then lifted with the frame member to free the fractured coating from the pipe.

The method of this invention broadly contemplates the steps of: (a) lowering into touching contact with the upper surface of a coated pipeline, a crusher assembly apparatus comprising a generally C-shaped rigid frame member which is equipped with driven opposing crusher blades located proximate the ends of the C-shaped frame member and driving means which are adapted to move the crusher blades; (b) applying a controlled driving force to the driving means to cause the crusher blades to contact and fracture the pipeline coating; (c) lifting the C-shaped frame member to separate the coating from the pipeline; (d) retracting the crusher blades to their original position; (e) advancing the C-shaped member to an adjacent position along the pipeline; and (f) repeating the steps (a)–(e) until the desired section of pipeline has been freed of its coating.

Although particularly adapted to sub-sea work, the crusher assembly of this invention can be used to remove coatings from pipelines that are buried or above ground, or simply to crush concrete pipe sections which no longer have utility.

DETAILED DESCRIPTION OF THE PREFERRED EMBODIMENT

Figure 1:
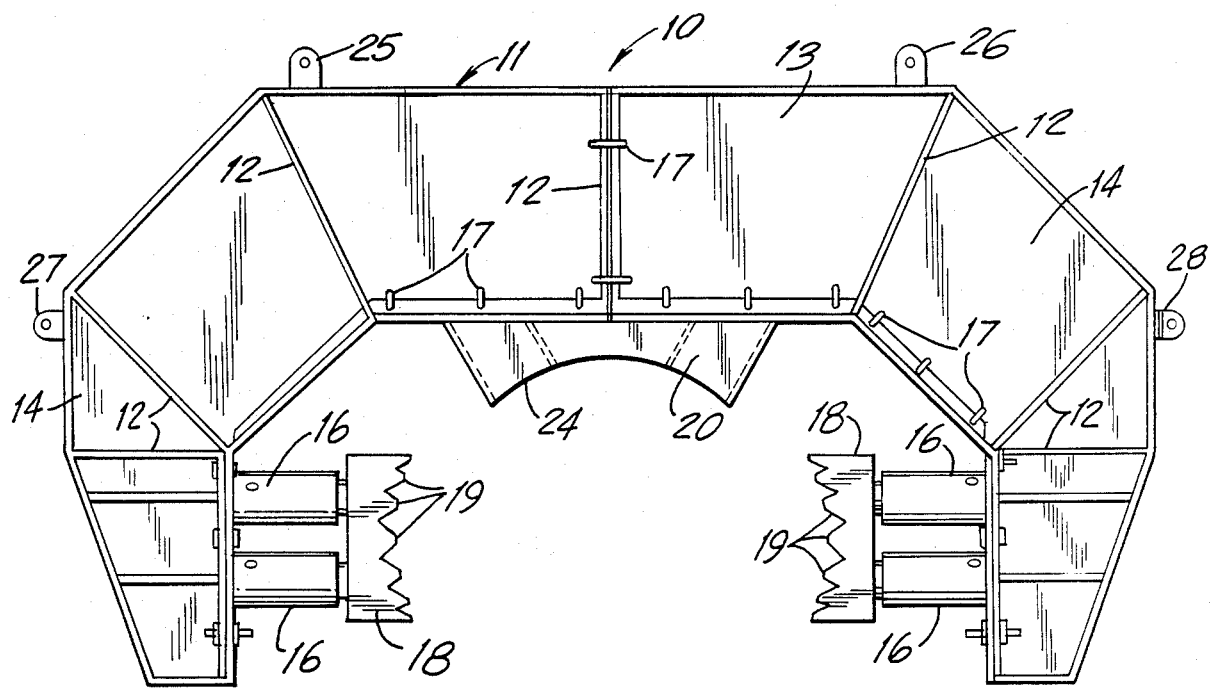
FIG. 1 is a front elevation showing a preferred embodiment of the apparatus.

The elements comprising the apparatus 10 for removing concrete weight coats from submerged pipelines will be described with reference to FIG. 1. The apparatus includes a generally C-shaped reinforced rigid frame member 11 defining an intermediate central section 13 and opposing end sections 14. The frame member 11 is reinforced by gusset plates 12 placed at internal stress points within the frame 11. The dimensions of frame member 11 are adapted to accommodate the dimensions of the pipe 30 having a diameter (x) and the surface coat 32 having a thickness (y). The device is positioned in perpendicular alignment with the longitudinal axis 31 of the pipeline 30 by an inwardly facing arcuate supporting member 16 positioned approximately midway between ends of the frame member on the intermediate central section 13.

Figure 2:
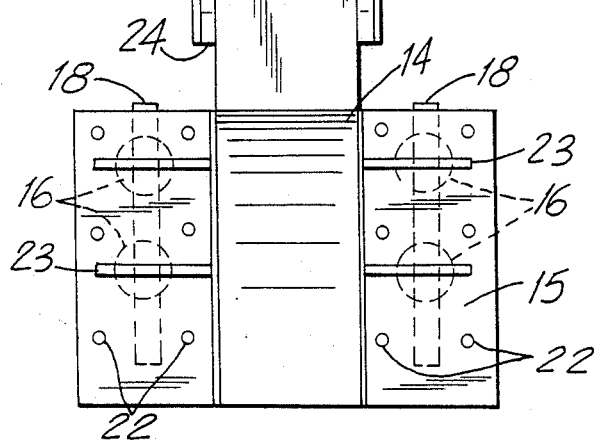
FIG. 2 is a side elevation of the embodiment of FIG. 1.

Attached proximate to the end of each of the downwardly extending end sections 14 of frame member 11 are plates 15 to which are attached driving means, which in this preferred embodiment, comprise a plurality of opposed inwardly directed hydraulic cylinders, or rams, 16. In a preferred embodiment the ram piston travels about six inches. The end view of FIG. 2 illustrates an embodiment in which four hydraulic rams 16 are secured to plate 15 by fastening means 22, which can be nuts and bolts. Plate 15 is securely affixed to the opposing end sections 14 of frame member 11, as by welding. Pressurized hydraulic fluid is delivered to rams 16 via fittings 23. Two crusher blades 18, described in more detail below, are securely affixed to the pairs of rams on either side of plate 15. In other embodiments, a crusher blade can be attached to a single ram piston; a single crusher blade can be affixed to three or more ram pistons; and more than two crusher blades can be arrayed on plate 15. Other means and mechanisms for positioning the crusher blades with respect to the coating surface and the driving means will be apparent to those skilled in the art. For example, piston movement can be translated through levers, pivots or gears to the crusher blades. The driving force can be provided by fluid driven motors. Suffice it to say, the method requires that the crusher blades be retracted to their respective original, or starting, positions at the beginning of each crushing cycle.

As shown in FIGS. 1 and 2, the centrally positioned support 20 is affixed to the central section 13 of frame member 11, and has an arcuate face 24 which contacts the coated pipe. In a preferred embodiment the arcuate surface 24 defines an arc of about 90°. The size and dimensions of support 20 are adapted to provide a stable contact surface between the apparatus 10 and the coated pipe, and to facilitate the positioning of the crusher blades in a plane that passes through the longitudinal axis 31 of the pipeline 30. The initial positioning of the crusher blades with respect to the pipeline is extremely important, since if the blades were to pass substantially above or below the axial plane of the pipeline, one or both of the blades could puncture the pipe. It will be appreciated that the distance between the central section 13 and the contact surface 24 of support 20 will vary with the overall construction of frame member 11, and particularly end sections 14, and could be reduced to zero so that the contact surface 24 of support 20 coincides with the inner surface of central section 13. In the latter embodiment, frame member 11 can be fabricated from segments of an I-beam, or girder, with intermediate gusset plates 12, and the inward facing side of central section 13 can be fitted with an arcuate metal plate approximating the surface of the coated pipe, or an arcuate section can be cut from the girder and the arcuate plate welded in the resulting recessed area. Other adaptations of the invention will be apparent to those skilled in the art from this disclosure.

Figure 3:
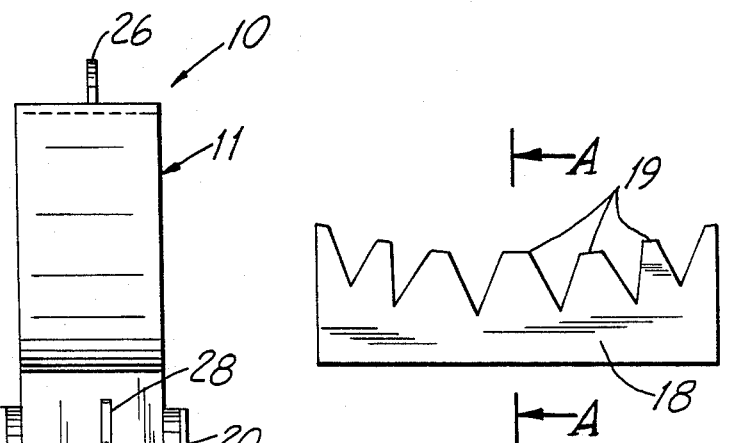
FIG. 3 is a front elevation of the crusher blades.
Figure 3A:
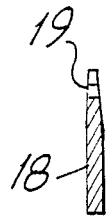
FIG. 3A is a sectional view of the crusher blades of FIG. 3 along line A—A.

Each ram is connected through control means to a conventional external source of pressurized hydraulic fluid, (not shown), via hoses 20 which are conveniently secured along the inner edges of the frame member 11 by hose clamps 7. Attached to the pistons of the rams 16 are hardened steel wedge-shaped crusher blades 18 with radially disposed truncated teeth 19. As shown in FIGS. 3 and 3A the teeth at the center of the blade are about one inch wide, and the outer teeth are about one-half in width. The base of the blade is 2 inches thick and this thickness extends to the base of the teeth 19. The teeth 19 are tapered towards their ends. The leading edges of the teeth form a concave arcuate configuration corresponding generally to the curvature of the outer surface of the coated pipe.

Figure 5A:
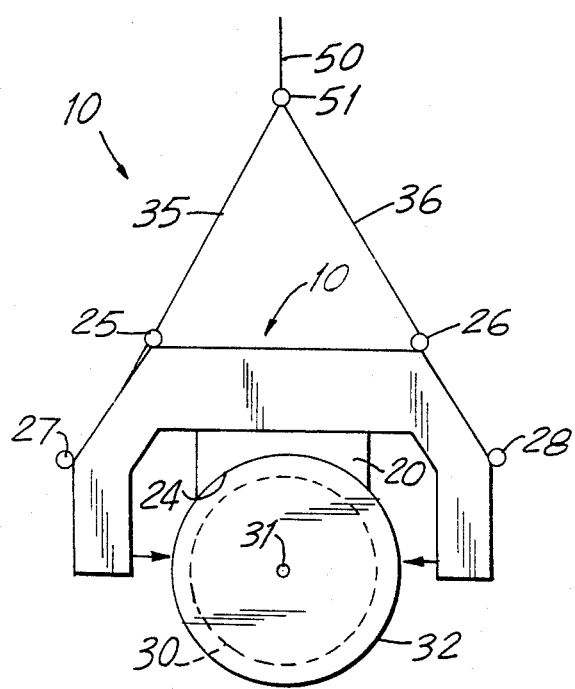
FIGS. 5A and 5B are schematic views illustrating the positioning of the apparatus by means of suspension cables.
Figure 5B:
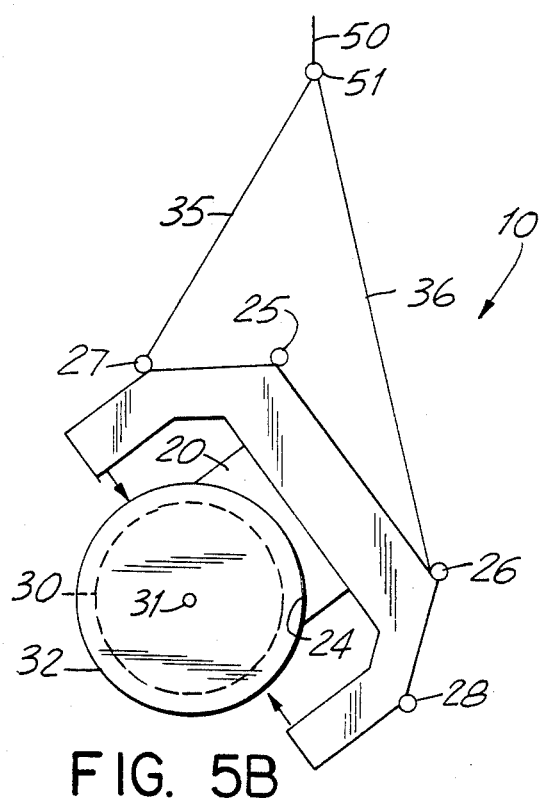

The apparatus 10 is lowered into position from above by cables 35 and 36 attached to at least two lugs, or rings, 25, 26, 27 and 28. These lugs are provided to permit rotation of the apparatus about the circumference of the pipe. As shown in FIG. 5A, when cables 35 and 36 are attached to rings 25 and 26, concrete on the plane horizontal to the central axis of the pipe is crushed. If supporting cables 35 and 36 are attached to rings 25 and 27 or 26 and 28, as shown in FIG. 5B, concrete on the plane more nearly vertical to the central axis is crushed. By adjusting the distance between attachment ring or clevis 51 which is at the end of surface suspension cable 50, and the rings 25 and 26, the radial position of the crusher blades is determined. A plurality of cables of varying lengths can be provided at ring 51, or means for securing a single cable at a given position adjustable by the driver, can be provided.

As will be obvious to one skilled in the art, at the maximum travel of the hydraulic ram pistons, the crusher blades must be spaced apart by some distance which is slightly greater than the outside diameter of the steel pipe from which the concrete coating is to be removed. Some further margin of safety can be provided by designing the concave arcuate surface defined by the crusher blade with a radius of curvature which is somewhat larger than that of the pipeline. Such a design will reduce the potential that one or the other end of a crusher blade that is misaligned will penetrate through the concrete coat and damage the pipeline.

The details of the dimensions and construction of the frame member and related elements can be varied, the only limitations being that it be sufficiently strong to withstand the expansive force developed during operation of the rams; that the distance between the retracted crusher blades be sufficient to readily accommodate the coated pipeline, i.e., $x+2y$; and, optionally, that its position with respect to the horizontal diameter of the pipe be variable by adjustment of the suspension cables.

Figure 4:
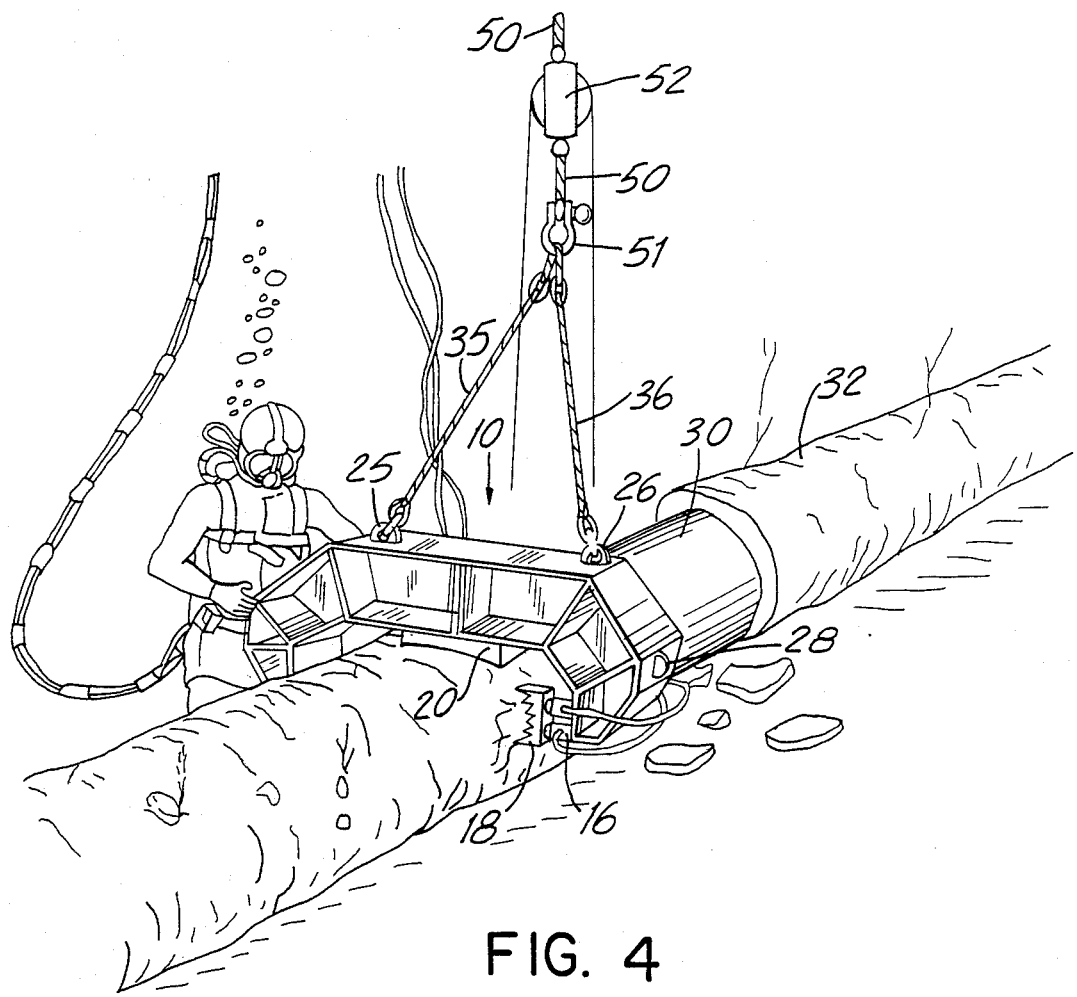
FIG. 4 is a perspective view of the apparatus in operation.

Reference is made to FIG. 4, which illustrates the apparatus in position on a submerged pipeline.

In undersea operations, the apparatus 10, attached to cable 50, is lowered by a crane (not shown) to the location of the submerged pipeline. A diver positions the apparatus in contact with the pipe to be cleaned and signals a surface operator to extend the ram pistons. Upon receipt of such signal, the operator activates the remote hydraulic power unit thus directing pressurized hydraulic fluid into the rams 16, the pistons of which extend and move the attached crusher blades 18 towards the coated pipe. When the crusher blades 18 contact the concrete coat 32 on the pipe 30, the diver signals the operator, who then carefully monitors pressure build up until about 5000 psi is reached, or until the diver signals the operator to "stop". When concrete crushing is complete, the diver signals the operator to slowly raise the crusher assembly 10 to separate the crushed coating and part any reinforcing wire which might be present. When this step is complete, the diver signals the operator to lower the pressure and to retract the ram pistons and the blades. If necessary, the apparatus may be then rotated by the diver, by adjusting the cables attached to rings 25, 26, 27 and 28, and without moving the apparatus longitudinally along the pipeline. The entire sequence can be repeated as often as is necessary to remove the concrete from one section, and the apparatus then moved to an adjacent section of the pipeline.

In a further preferred embodiment, the diver is himself provided with the means for controlling the driving force, which in this example is the pressurized hydraulic fluid that is admitted to the cylinders to advance the crusher blades, and to thereafter retract the crusher blades. Moreover, by interposing a hand operable or hydraulic motor-driven block and fall 52 between the suspending cable ring 51 and the frame member 11, the diver can raise and lower the apparatus from one work position and shift it longitudinally to an adjacent work position on the pipeline.

The use of a block and fall 52 at the end of the surface suspension cable 50 can also be used to advantage in expediting the alignment of the apparatus circumferentially about the pipe. For example, by shifting the suspending cable from ring 26 to ring 27, the orientation of the frame member 11 can be varied from generally horizontal to nearly vertical. This permits the diver to position the apparatus in an essentially infinite number of positions to optimize the angle, or point of attack by the crusher blades to facilitate the removal of the concrete coating.

It will also be appreciated that a plurality of cables could be attached to rings $26 \propto 28$, with each cable independently controllable from the surface. Such a configuration is shown in FIG. 5B, where cables 35 and 36, are attached to rings 25 and 28, respectively. With the apparatus 10 originally positioned over the pipeline, and supporting member 20 in contact with the upper surface of the concrete coating, tension is relaxed on the cables, and cable 35 is shortened and 36 lengthened by approximately the radius of the coated pipe. This will cause left end section 14 to move to a position over the upper surface of the pipeline with a corresponding downward shift in the blades on the opposing end section 14. Actuation of the pistons will cause the crusher blades to fracture the concrete at the upper and lower regions of the pipe. Intermediate positioning of the crusher blades can be accomplished by reducing the tension on supporting cable 35, and taking up slightly on cable 36, through to ring 51.

While the invention has been described in the context of embodiments that relate to its utility in an underwater environment, it is apparent that the apparatus and methods can be applied with equal advantage to the removal of coatings from pipes and the like that are not submerged. The apparatus 10 can be suspended by a tripod, or like means above a coated pipeline that is on the ground or in a trench. The ease of rotating the apparatus about the central axis of the pipe by varying the lengths and points of attachment of the cables 40 to lugs 25-28 would prevail under the effects of a normal gravitational force.

This description of the embodiments of the apparatus and method of the invention are to be construed as illustrative only, and for the purpose of teaching those skilled in the art the manner of carrying out the invention. Various changes in size and configuration have been disclosed, and others are apparent from this disclosure. Certain features of the invention can be utilized independently of other features, and applied in circumstances in addition to those illustrated.

The invention claimed is:

1. Apparatus for the removal of a concentric cementitious coating form a coated pipeline comprising a generally C-shaped rigid frame member defining an intermediate central section and opposing end sections, an inwardly facing stationary rigid support member affixed to the intermediate central section and adapted to contact the outer surface of the coated pipeline, drive means affixed to each opposing end section, a plurality of opposed, inwardly facing crusher blades adapted to penetrate the cementitious coating, each of the crusher blades adapted to move in response to movement of the drive means, and means for providing a controlled driving force from a remote source to the drive means.

2. The apparatus of claim 1 in which the inwardly facing support comprise an arcuate surface affixed to the intermediate central section.

3. The apparatus of claim 2 where the arcuate support surface defines an arc of approximately 90°.

4. The apparatus of claim 1 in which the drive means comprise a plurality of hydraulic rams.

5. The apparatus of claim 4 in which the hydraulic rams are removeably affixed to plates which are secured to opposing faces of the end sections.

6. The apparatus of claim 1 in which each crusher blade is attached to two rams and the apparatus comprises two pairs of opposed crusher blades.

7. The apparatus of claim 1 which includes a plurality of points of attachment on the frame member adapted to receive suspension cables.

8. The apparatus of claim 7 which further comprises suspension cables and a hoist adapted to be operated from a location proximate the frame member.

9. Apparatus for fracturing a cementitious coating of predetermined thickness surrounding a tubular structure comprising: a generally C-shaped rigid frame member to which are secured a plurality of opposed and inwardly directed hydraulic piston rams located proximate the ends of the frame member, a plurality of wedge-shaped crusher blades affixed to the rams, each crusher blade comprising a plurality of radially disposed teeth terminating in an arcuate configuration, a stationary rigid arcuate support member inwardly disposed on the central section of the frame member and adapted to contact the surface of the concrete coating to thereby position the frame member in a plane transverse to the longitudinal axis of the tubular structure and to position the crusher blades in a plane passing through the central axis of the pipe; and means for supplying to the rams a controlled volume of pressurized hydraulic fluid from an external source.

10. The apparatus of claim 9 which further comprises means for suspending and positioning said frame member about the longitudinal axis of the coated structure.

11. The apparatus of claim 8 where the means for suspending and positioning the frame member comprise at least one cable and a plurality of points of attachment extending outwardly from the outer surface of the frame member.

12. The apparatus of claim 11 in which the suspending means includes a central suspension cable affixed to cables terminating in at least two points of attachment on the frame member.

13. The apparatus of claim 9 where each crusher blade is attached to at least two rams.

14. The apparatus of claim 9 where the crusher blade is comprised of at least five teeth and the tips of said teeth define the segment of an arc having a radius of about 0.4 meters.

15. The apparatus of claim 10 which comprises eight rams and four crusher blades.

16. The apparatus of claim 11 where said crusher blades are parallel and separated by approximately 0.6 meters.

17. In the method of removing a concentric cementitious coating from a coated pipeline employing opposed force application means, the improvement which comprises:
  (a) deploying at a first position along the coated pipeline a crusher assembly comprising: a generally C-shaped rigid frame member defining an intermediate central section and opposing end sections, an inwardly facing stationary rigid support member on said central section adapted to contact the coated pipeline, moving drive means affixed to each opposing end section, crusher blades adapted to move in response to the drive means, and means for providing a controlled driving force from a remote to the drive means;
  (b) contacting the coated pipeline with the crusher assembly;
  (c) applying the driving force to the drive means to drive the crusher blades into the cementitious coating and thereby crush and fracture the coating in the region of the blades;
  (d) raising the crusher blades to separate the crushed coating from the pipeline;
  (e) retracting the crusher blades;
  (f) advancing the frame member longitudinally along the pipeline to a position adjacent the first position;
  (g) repeating steps (b) through (f) until the coating has been removed from the desired length of pipeline.

18. The method of claim 17 in which pressurized hydraulic fluid is applied as the driving force.

19. The method of claim 18 in which the driving force is applied to hydraulic rams.

20. The method of claim 19 in which the crusher blades are driven directly by the piston of the hydraulic ram.

21. The method of claim 17 which the crusher assembly is positioned on a pipeline submerged in a body of water.

22. The method of claim 21 which includes the further step of suspending the crusher assembly from a platform at the surface of the water.

23. The method of claim 22 which includes the further step of controlling the diving force and suspension of the crusher assembly from the surface platform.

24. The method of claim 22 which includes the further step of manually positioning the crusher assembly on the pipeline.

25. The method of claim 24 which further includes the step of raising and lowering the crusher assembly to the desired position on the pipeline by hoist means controlled by a diver.

26. The method of claim 24 which includes the step of controlling the driving force applied to the drive means from a position proximate the crusher assembly.

27. The method of claim 24 which includes the step of moving and activating the crusher assembly by means located on the surface platform in response to voice commands of a diver who is proximate the crusher assembly.

28. The method of claim 17 which comprises the further steps of:
    (h) rotating the crusher assembly about the longitudinal axis of the pipeline while maintaining the frame member in contact with the pipeline;
    (i) repeating method steps (c) through (e), above;
    (j) repeating method steps (b) through (f), (H) and (i) until the coating has been removed from the desired length of pipeline.

* * * * *